United States Patent
Oota

(10) Patent No.: US 9,300,955 B2
(45) Date of Patent: Mar. 29, 2016

(54) INFORMATION PROCESSING APPARATUS, INFORMATION PROCESSING METHOD, AND PROGRAM

(71) Applicant: SONY CORPORATION, Tokyo (JP)

(72) Inventor: Hiroshi Oota, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 38 days.

(21) Appl. No.: 14/458,640

(22) Filed: Aug. 13, 2014

(65) Prior Publication Data
US 2015/0063784 A1    Mar. 5, 2015

(30) Foreign Application Priority Data

Aug. 28, 2013  (JP) .................................. 2013-176715

(51) Int. Cl.
*H04N 5/92*  (2006.01)
*H04N 17/00*  (2006.01)

(52) U.S. Cl.
CPC ................................... *H04N 17/004* (2013.01)

(58) Field of Classification Search
CPC ..... H04N 17/004; H04N 5/92; H04N 9/8042; H04N 5/85; G11B 27/105; G11B 27/3027; G11B 2220/20
USPC ........................................................ 386/263
See application file for complete search history.

(56) References Cited

U.S. PATENT DOCUMENTS

| | | | | |
|---|---|---|---|---|
| 5,083,860 A | * | 1/1992 | Miyatake | G11B 27/11 348/E5.067 |
| 6,690,725 B1 | * | 2/2004 | Abdeljaoud | G06T 7/2033 348/700 |
| 2010/0053337 A1 | * | 3/2010 | Kirk | H04N 17/045 348/181 |
| 2014/0099028 A1 | * | 4/2014 | Shirron | G06F 17/243 382/181 |

FOREIGN PATENT DOCUMENTS

JP    2012-151796 A1    8/2012

* cited by examiner

*Primary Examiner* — William Tran
(74) *Attorney, Agent, or Firm* — Hazuki International, LLC

(57) ABSTRACT

An information processing apparatus includes an input unit, a storage unit, and a control unit. The input unit receives processed data having resulted from a process in which a test-content is read and processed by a device to be evaluated. The test-content is composed of a plurality of units for reproduction ordered along a time axis, each unit for reproduction having feature points, the number of the feature points monotonically increasing or decreasing by a predetermined difference along passage of reproduction time. The storage unit stores the predetermined difference. The control unit calculates the numbers of the feature points with respect to each of two adjacent units among the units for reproduction in the processed data, and detects an error in the processed data by determining whether or not a difference between the calculated numbers of the feature points is equal to the stored difference.

9 Claims, 14 Drawing Sheets

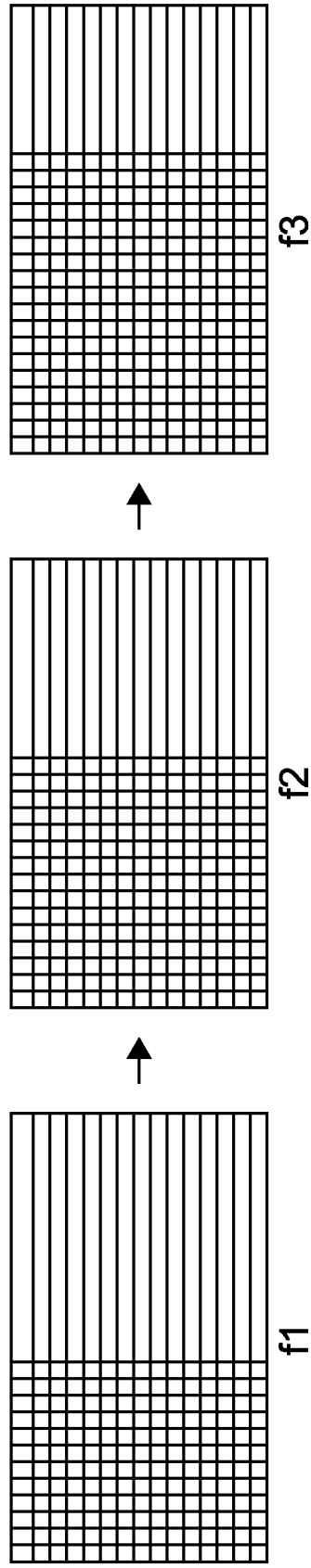
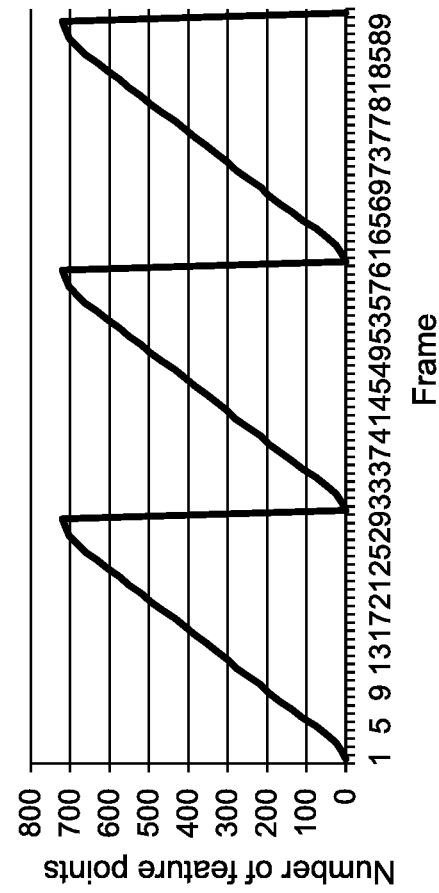
FIG.3A
FIG.3B

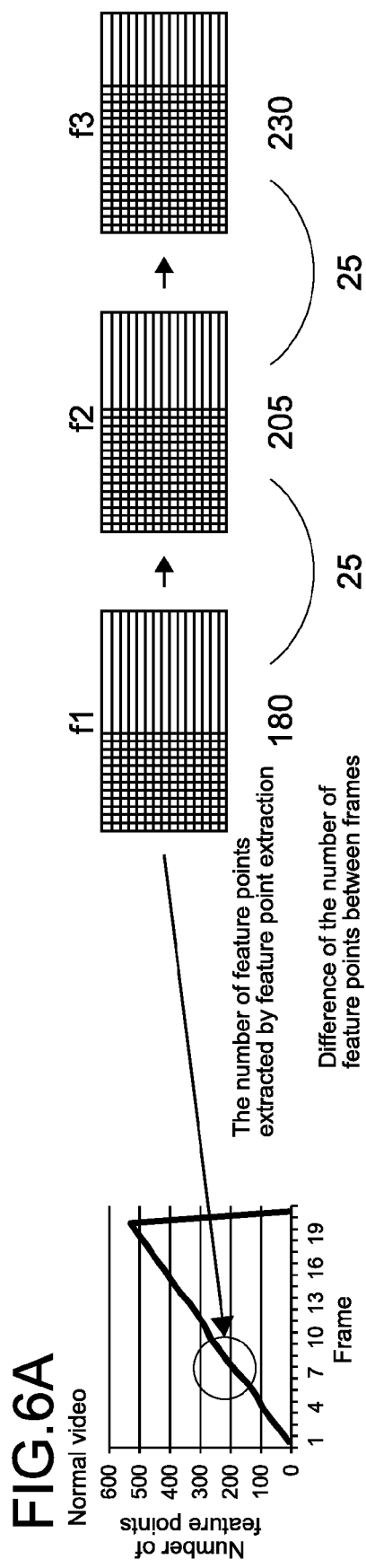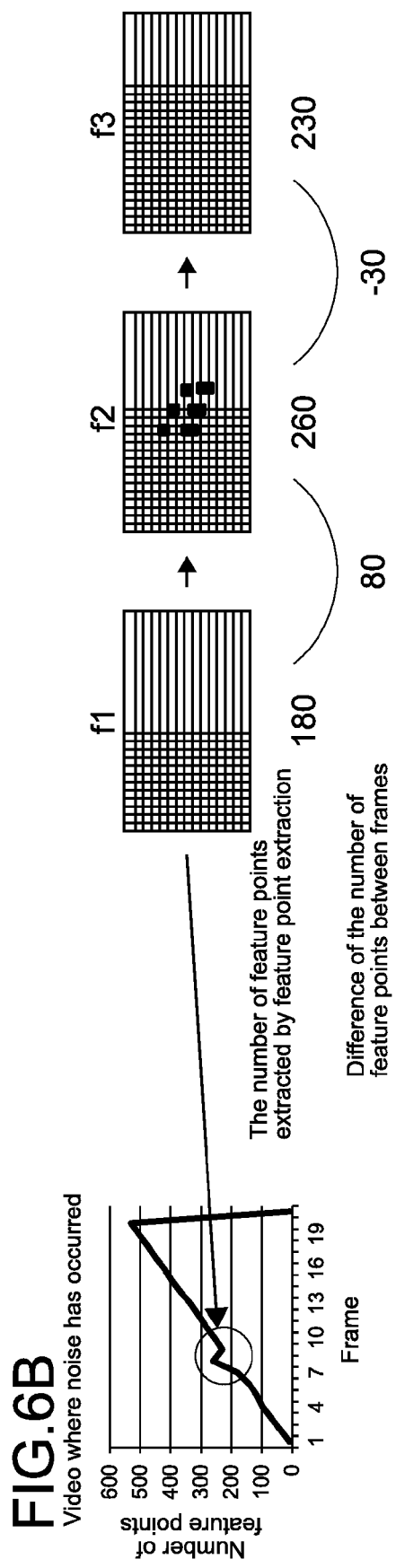

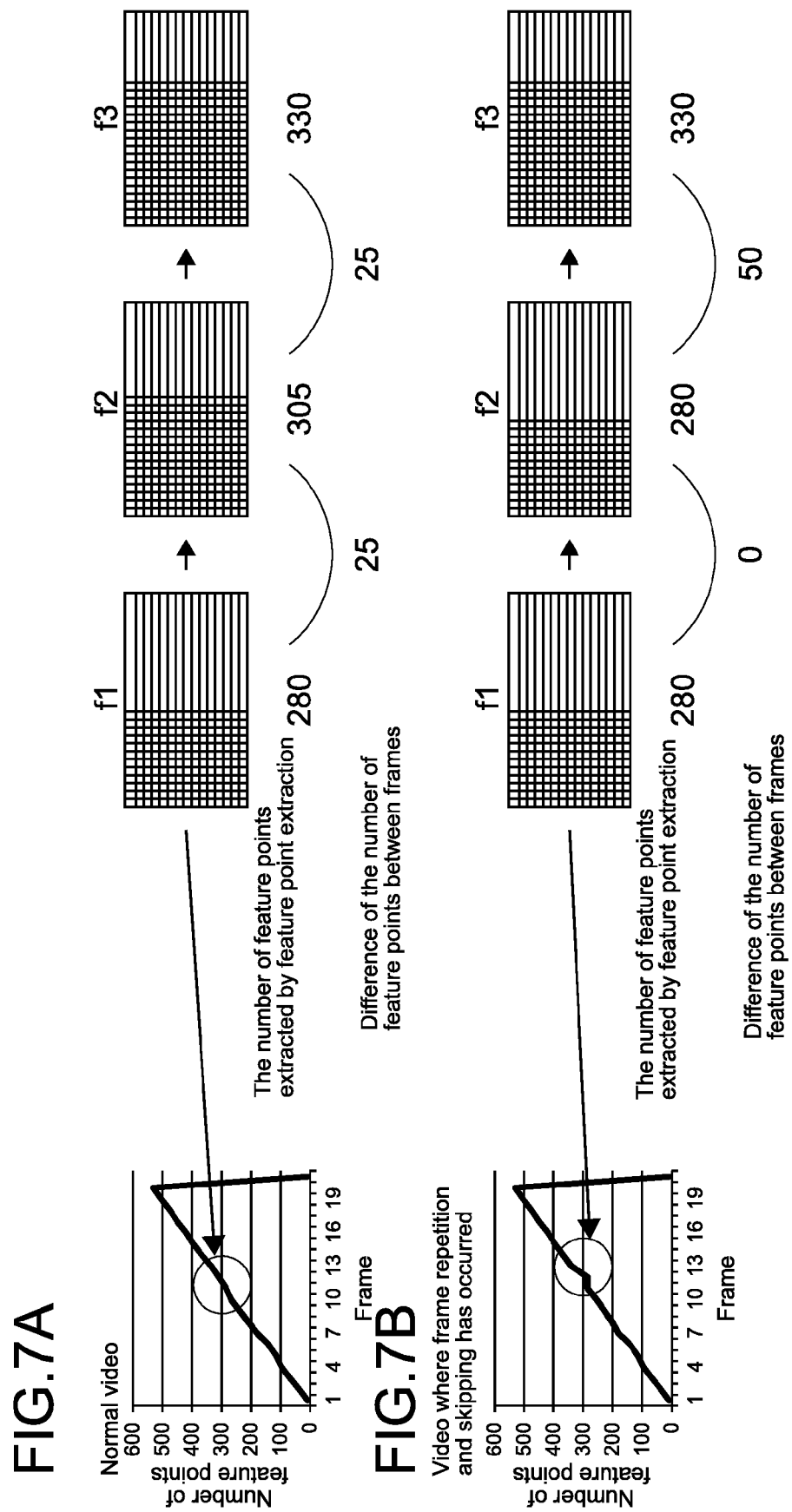

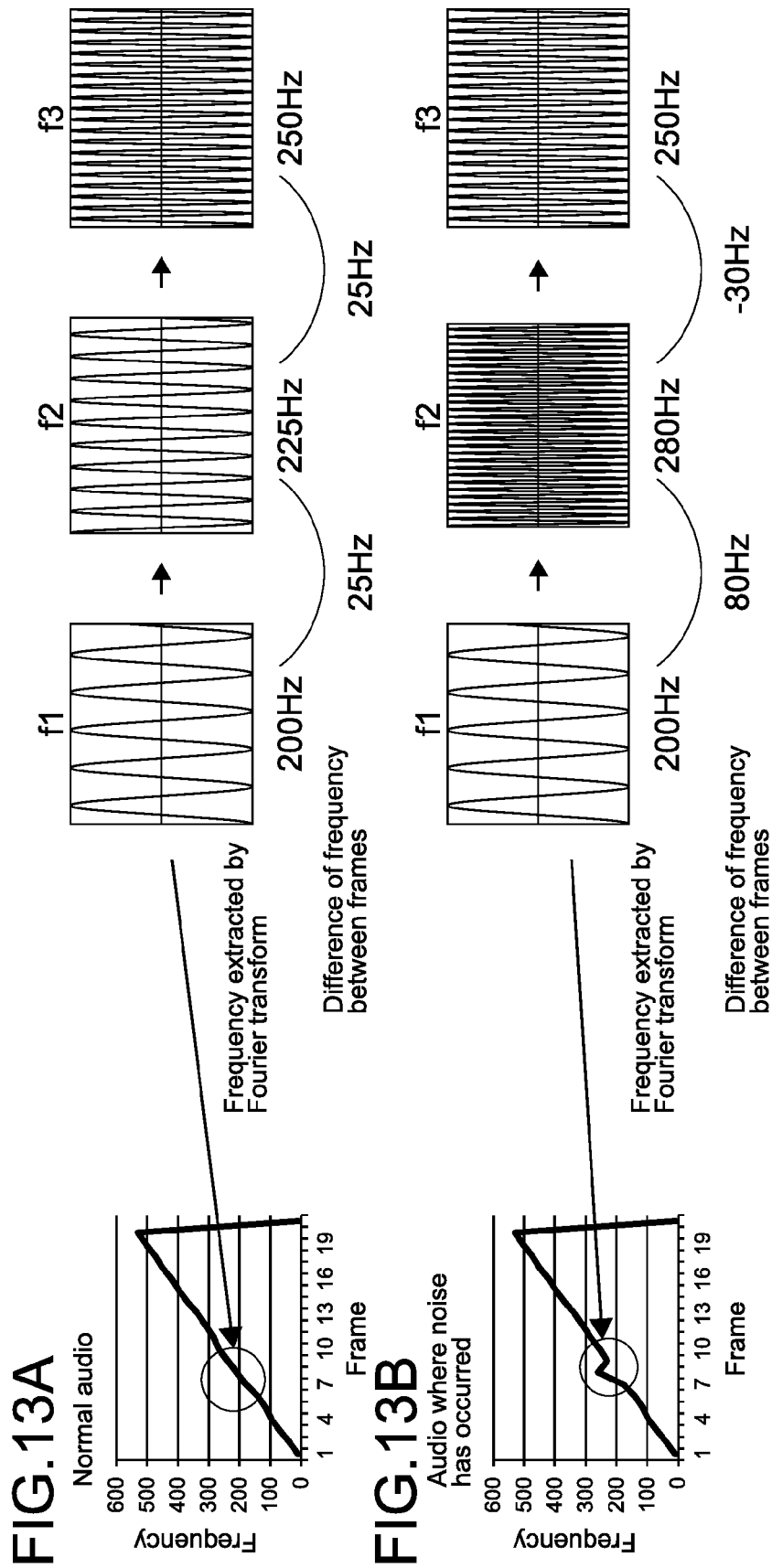

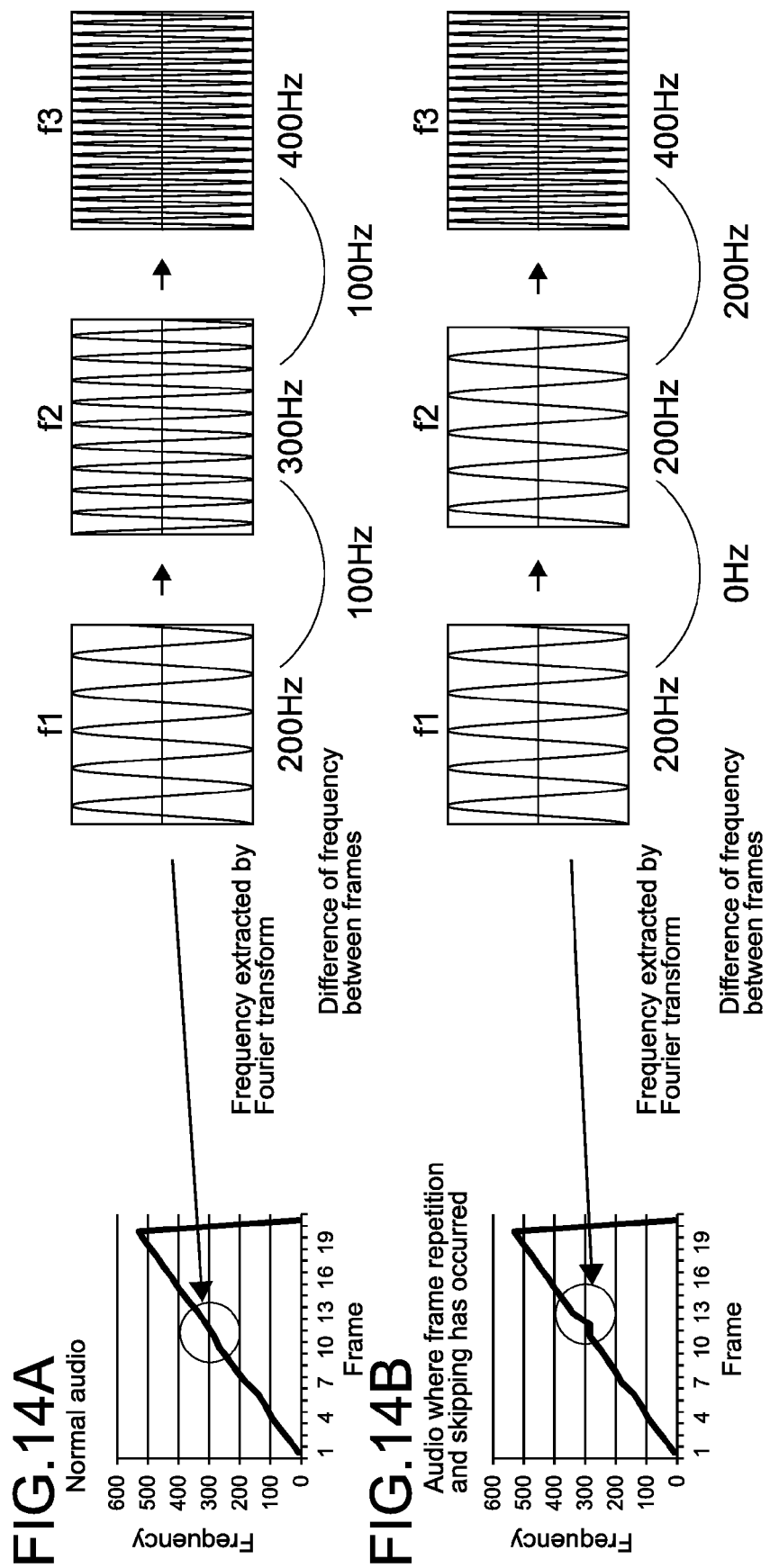

INFORMATION PROCESSING APPARATUS, INFORMATION PROCESSING METHOD, AND PROGRAM

CROSS REFERENCE TO RELATED APPLICATIONS

This application claims the benefit of Japanese Priority Patent Application JP 2013-176715 filed Aug. 28, 2013, the entire contents of which are incorporated herein by reference.

BACKGROUND

The present disclosure relates to an information processing apparatus capable of detecting an error in video data and audio data, and an information processing method and a program for the information processing apparatus.

To ensure quality of products such as television sets, video recorders, video editing devices and other devices which are capable of reproducing or recording video data, pre-delivery evaluation regarding such devices has been conducted. The evaluation is conducted by reproducing or recording video data with those devices and checking if an error such as noise does not occur. In this error detection method, for example, synchronization by frame is taken between a reference video file and a target video file. Feature points in the corresponding frames between these video files are extracted. An error is detected by detection of a difference in the number of the feature points between the video files (see for example Japanese Patent

SUMMARY

However, in the above-mentioned error detection method, the numbers of the feature points in the two video files are compared with each other, frame by frame. This might take much time for such processing of comparison.

In view of the circumstances as described above, there is a demand for providing an information processing apparatus, an information processing method and a program that are capable of speeding up the processing of error detection for evaluating data reproduction and recording quality of a device.

According to an embodiment of the present disclosure, there is provided an information processing apparatus including an input unit, a storage unit, and a control unit.

The input unit is configured to receive processed data having resulted from a process in which a test-content is read and processed by a device to be evaluated. The test-content is composed of a plurality of units for reproduction ordered along a time axis, each unit for reproduction having feature points, the number of the feature points monotonically increasing or decreasing by a predetermined difference along passage of reproduction time.

The storage unit is configured to store the predetermined difference.

The control unit is configured to calculate the numbers of the feature points with respect to each of two adjacent units among the units for reproduction in the processed data, and detect an error in the processed data by determining whether or not a difference between the calculated numbers of the feature points is equal to the stored difference.

With this configuration, the information processing apparatus is capable of speeding up the processing of error detection for evaluating data reproduction and recording quality of a device to be evaluated.

The control unit may determine that the error is a noise error including a contamination of noise in the processed data, in cases where the calculated difference is not equal to the stored difference, not zero, and not an integer multiple of the stored difference. This allows the information processing apparatus to detect a noise error in the processed data.

The control unit may determine that the error is a repeat error including a repetition of a certain part of the units for reproduction in the processed data, in cases where the calculated difference is not equal to the stored difference and the calculated difference is zero. This allows the information processing apparatus to detect a repeat error in the processed data.

The control unit may determine that the error is a skip error in which a certain part of the units for reproduction in the processed data is skipped, in cases where the calculated difference is not equal to the stored difference and the calculated difference is an integer multiple of the stored difference. This allows the information processing apparatus to detect a skip error in the processed data.

The monotonic increase or decrease of the feature points may be periodically repeated every predetermined edge point in the test-content. In this case, the control unit may determine that the error has occurred in cases where at least one of the numbers of the feature points with respect to each of two units across the edge point among the units for reproduction is zero, while the calculated difference between the numbers of the feature points with respect to each of the two units is different from a difference between predetermined maximum and minimum values of the number of the feature points. This allows the information processing apparatus to detect an error by a fact that the number of the feature points has largely decreased or increased at a position of the unit for reproduction other than the edge points.

The test-content may be a video content having a plurality of frames as the units for reproduction. In this case, the control unit may extract two pieces of still image data which are two frames from the processed data, and extract feature points and calculate the number of the feature points from each of the two pieces of still image data.

With this configuration, the information processing apparatus can detect an error by extracting still image data from the test-content which is video data, and by making a comparison of the image data.

The test-content may include audio data having pieces of waveform data as the units for reproduction, each piece of waveform data being data between a plurality of periodically repeated mute intervals, the piece of waveform data having a frequency as the number of the feature points, the frequency monotonically increasing or decreasing across each mute interval in the mute intervals. In this case, the control unit may extract two pieces of waveform data across each mute interval from the processed data, and calculate the frequencies of each of the two pieces of waveform data.

With this configuration, the information processing apparatus can detect an error by extracting waveform data from the test-content which is audio data, and by making a comparison of the waveform data, in a manner similar to that of the frame in the video data.

The information processing apparatus may further include an output unit configured to output information of a result of detection indicating the detected error.

With this configuration, the information processing apparatus can let an operator know the result of error detection.

According to another embodiment of the present disclosure, there is provided an information processing method including reading processed data having resulted from a process in which a test-content is read and processed by a device to be evaluated. The test-content is composed of a plurality of units for reproduction ordered along a time axis, each unit for reproduction having feature points, the number of the feature points monotonically increasing or decreasing by a predetermined difference along passage of reproduction time.

The method further includes calculating the numbers of the feature points with respect to each of two adjacent units among the units for reproduction in the processed data. The method further includes detecting an error in the processed data by determining whether or not a difference between the calculated numbers of the feature points is equal to the stored difference.

According to still another embodiment of the present disclosure, there is provided a program causing an information processing apparatus to execute: reading processed data having resulted from a process in which a test-content is read and processed by a device to be evaluated, the test-content being composed of a plurality of units for reproduction ordered along a time axis, each unit for reproduction having feature points, the number of the feature points monotonically increasing or decreasing by a predetermined difference along passage of reproduction time; calculating the numbers of the feature points with respect to each of two adjacent units among the units for reproduction in the processed data; and detecting an error in the processed data by determining whether or not a difference between the calculated numbers of the feature points is equal to the stored difference.

As described above, according to the present disclosure, it is possible to speed up the processing of error detection for evaluating data reproduction and recording quality of a device.

These and other objects, features and advantages of the present disclosure will become more apparent in light of the following detailed description of best mode embodiments thereof, as illustrated in the accompanying drawings.

BRIEF DESCRIPTION OF DRAWINGS

FIGS. 3A and 3B show a test-content which is used in the first embodiment;

FIGS. 6A and 6B show an overview of noise error detection processing of the first embodiment;

FIGS. 7A and 7B show an overview of skip error detection processing of the first embodiment;

FIGS. 13A and 13B show an overview of noise error detection processing of the second embodiment; and FIGS. 14A and 14B show an overview of skip error detection processing of the second embodiment.

DETAILED DESCRIPTION OF EMBODIMENTS

Hereinafter, some embodiments of the present disclosure will be described with reference to the drawings.

First Embodiment First embodiment of the present disclosure will be described. In this embodiment, a case of detecting an error in a content, which content is a video content, will be described.

System Overview

Figure 1:
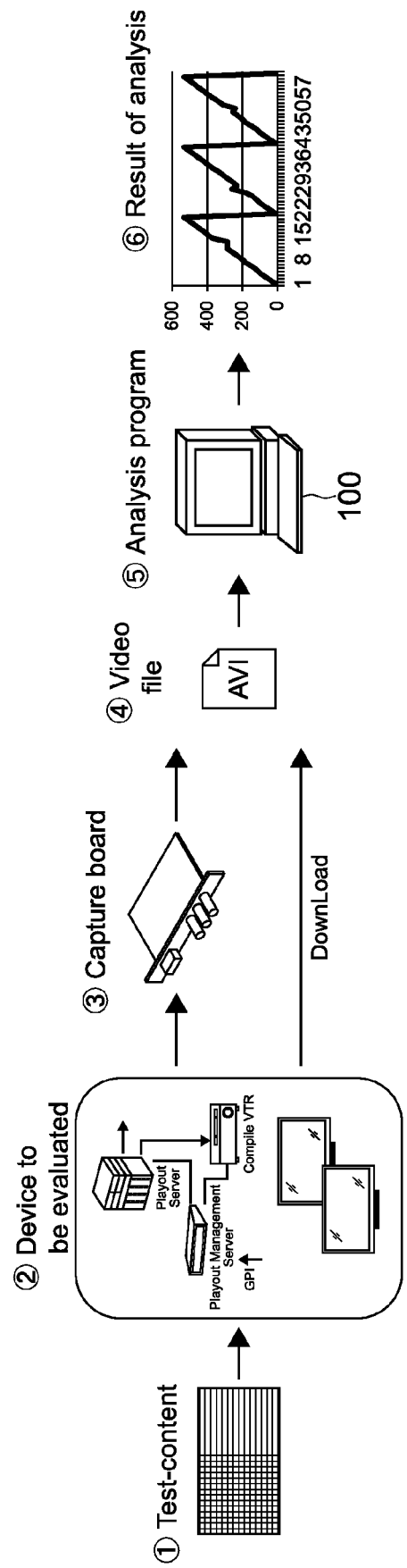
FIG. 1 shows a configuration of a system according to first embodiment of the present disclosure.

FIG. 1 shows a configuration of an error detection system according to this embodiment. As shown in FIG. 1, the system includes a device to be evaluated and an information processing apparatus such as PC (Personal Computer) 100 which executes an analysis program.

In this embodiment, first, a video content for testing (hereinafter referred to as a "test-content") is prepared, and then, the test-content is read by the device to be evaluated.

The device to be evaluated may be a device subjected to pre-delivery evaluation on the quality of the device (whether the device is capable of reproducing or recording the test-content properly). Examples of the devices to be evaluated include, but are not limited to, television sets, video recorders, video editing devices and the like. The term "read" as used in the above context means that the test content is input from an input terminal of the device and recorded by a recorder, in cases where the device to be evaluated is a video editing device. This term "read" means that the test content is input from an input terminal of the device and reproduced by a player, in cases where the device is a television set.

After some kind of processing such as recording and reproducing, which processing is executed by the above-mentioned device to be evaluated, the test-content would be output as video signals.

In cases where the device to be evaluated is provided with an input and output interface such as HDMI (R) (High-Definition Multimedia Interface) and SDI (Serial Digital Interface), the output video signals may be converted, by a capture board, to a video file in a prescribed format such as AVI (Audio Video Interleave). In cases where the reproduced test-content is able to be directly output as a video file from the device to be evaluated, (for example, in cases where the test-content is recorded as a video file on the device,) the video file may be used as it is.

Then, the output video file (processed data) is input to the PC 100 and analyzed by the analysis program installed in the PC 100. Thus, a result of analysis is output, and an error in a video which has occurred in the device to be evaluated is detected.

Hardware configuration of PC

Figure 2:
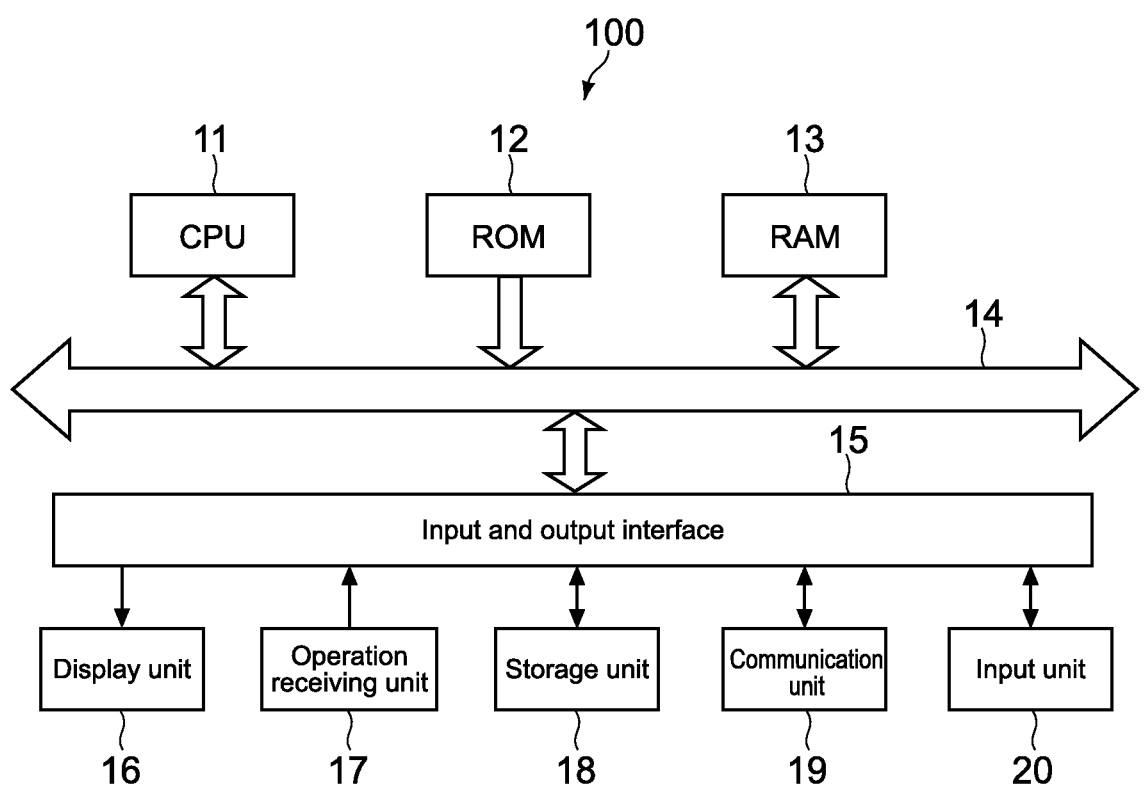
FIG. 2 shows a hardware configuration of a PC of the first embodiment.

FIG. 2 shows a hardware configuration of the PC 100. As shown in the figure, the PC 100 has a CPU (Central Processing Unit) 11, a ROM (Read Only Memory) 12, a RAM (Random Access Memory) 13, an input and output interface 15, and a bus 14 that connects those with each other.

The CPU 11 appropriately accesses the RAM 13 or the like when necessary and performs overall control for entire blocks of the PC 100 while performing various computation processes. The ROM 12 is a nonvolatile memory. In the ROM 12, an OS and various programs including the analysis program to be executed by the CPU 11, and firmware including various parameters, are fixedly stored. The RAM 13 is used as a work area or the like for the CPU 11. The RAM 13 may temporarily store the OS, various applications in execution, and various pieces of data in processing.

To the input and output interface 15, a display unit 16, an operation receiving unit 17, a storage unit 18, a communication unit 19, an input unit 20 and the like are connected.

Examples of the display unit 16 include a display device that uses an LCD (Liquid Crystal Display), an GELD (Organic Electro-Luminescence Display), a CRT (Cathode Ray Tube), or the like.

Examples of the operation receiving unit 17 include an input device such as a touch panel, a keyboard, a button, and the like. In cases where the operation receiving unit 17 is a touch panel, the operation receiving unit 17 is formed integrally with the display unit 16.

Examples of the storage unit 18 include a nonvolatile memory such as flash memory (SSD: Solid State Drive) and other solid state memories. In the storage unit 18, the analysis program; a feature point extraction program; data such as a video file, which data is output from the device to be evaluated; and the like, as well as an OS, may be stored. Further, in the storage unit 18, data including an increment (difference) of the number of the feature points from each frame to the next frame; predetermined maximum and minimum values; a difference between those maximum and minimum values; and the like, may also be stored.

The communication unit 19 is a module to be connected to a network. The communication unit 19 may perform processing of communication with other devices or apparatuses on a LAN (Local Area Network) or the Internet.

The input unit 20 may be, for example, an input and output interface such as a USB (Universal Serial Bus) terminal, to which, the video file taken out of the device to be evaluated is input. It is also possible that the video file can be input to the PC 100 by the communication unit 19 receiving the video file.

Test-Content

Next, the above-mentioned test-content, which is used in error detection processing, will be described. FIGS. 3A and 3B are figures for describing the test-content.

Regarding this embodiment, for detecting an error in a video, a test-content is prepared, which test-content is composed of a plurality of units for reproduction or, in other words, frames, ordered along a time axis. Each frame has feature points, and the number of the feature points monotonically increases by a predetermined difference along passage of reproduction time. This difference may be, for example, 25. Note that the value of the difference is not limited to this.

Specifically, for example, a content in which the number of grid-points as the feature points increases as the frame goes from f1 to f2 and from f2 to f3, as shown in FIG. 3A, may be used. The feature points are the points that are extracted by a known feature point extraction method such as edge extraction.

In addition, as shown in FIG. 3B, the monotonic increase of the number of the feature points is periodically repeated every predetermined fixed number of frames (according to the figure, every 30 frames), in the test-content. A periodic point in this case, that is, each position of the frame where the number of the feature points switches from the maximum to the minimum thereof, will be referred to as an "edge point", in this embodiment.

Operation of PC

Next, a description will be given on the operation of the PC 100 configured as described above. In this embodiment, the operation of the PC 100 is performed by the CPU 11 and the software (analysis program) executed under control thereof in cooperation with each other.

Overview of Error Detection Processing

Figure 4:
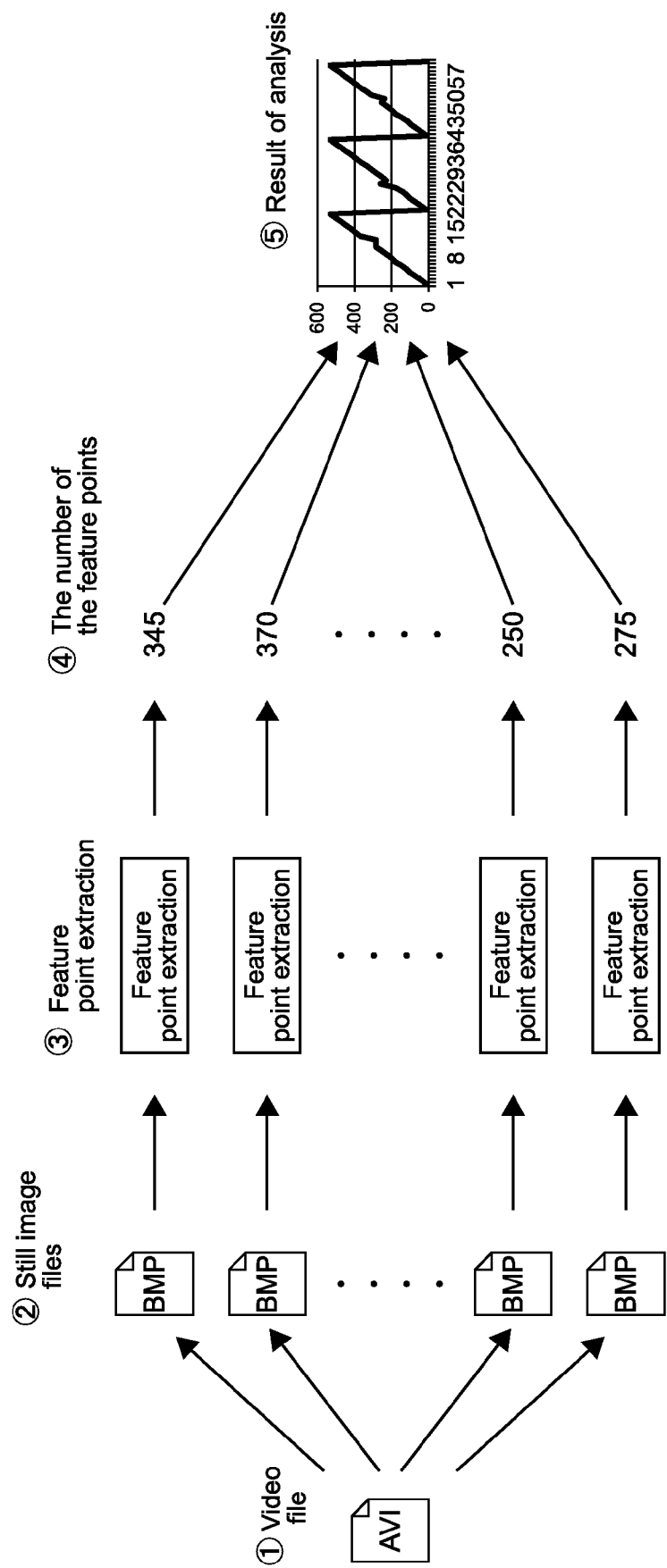
FIG. 4 shows an overview of error detection processing of the first embodiment.

FIG. 4 shows an overview of error detection processing of this embodiment. As shown in the figure, the PC 100 first extracts every frame, one by one, from the processed data which is a video file (e.g., AVI file) taken out of a device to be evaluated, the video file being input to (read into) the PC 100 via the input unit 20 or the like. The PC 100 converts each frame into a still image file such as a BMP (bitmap) file.

Subsequently, the PC 100 executes the feature point extraction program on the still image file, to extract feature points from the still image file.

Then, the PC 100 collects the number of the feature points for each frame, and outputs the numbers of the feature points as a result of analysis to the display unit 16. At this time, information related to various types of errors, which is determined according to the result of analysis, may be output together.

Details of Error Detection Processing

Figure 5:
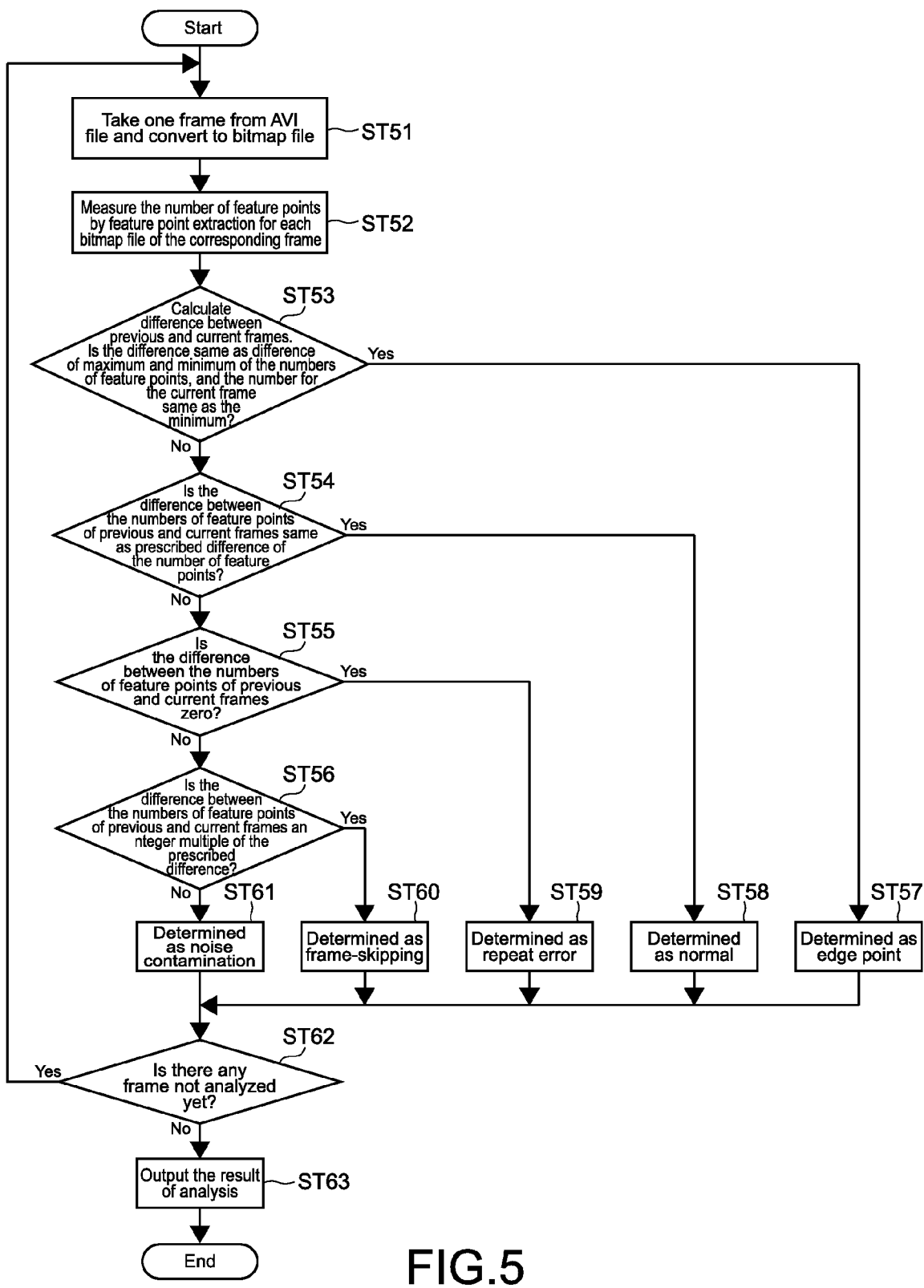
FIG. 5 is a flowchart showing the flow of error detection processing of the first embodiment.

FIG. 5 is a flowchart showing the flow of error detection processing of this embodiment. As shown in the figure, first, the CPU 11 of the PC 100 extracts one frame from the video file, which video file is taken out of, and input from, the device to be evaluated. The CPU 11 converts the extracted frame into a still image file such as a BMP file (Step 51).

Then, the CPU 11 extracts feature points by feature point extraction for each bitmap file of the corresponding frame, and measures the number of the feature points (Step 52).

Subsequently, the CPU 11 takes two frames to be processed, and calculates a difference between the number of the feature points of the current frame and the number of the feature points of one frame before the current one. The CPU 11 then determines whether or not the calculated difference between the numbers of the feature points is the same value as a difference between predetermined maximum and minimum values of the numbers of feature points (or in a predetermined range therefrom), and, whether or not the number of the feature points of the current frame is the same value as the minimum value (Step 53).

If the calculated difference is the same value as the difference between the maximum and minimum values, and the number of the feature points of the current frame is the same value as the minimum value ("Yes"), the CPU 11 determines that the current frame is an "edge point" (no error has occurred) (Step 57).

If the calculated difference is not the same value as the difference between the maximum and minimum values, or the number of the feature points of the current frame is not the same value as the minimum value ("No"), the CPU 11 determines whether or not the difference between the numbers of the feature points of the previous frame and the current frame is the same value as a prescribed difference of the number of feature points (e.g., 25) (Step 54).

If the difference between the numbers of the feature points of the previous frame and the current frame is the same value as the prescribed difference of the number of feature points ("Yes"), the CPU 11 determines that these two frames are normal (no error has occurred) (Step 58).

If the difference between the numbers of the feature points of the previous frame and the current frame is not the same value as the prescribed difference of the number of feature points ("No"), the CPU 11 determines whether or not the difference between the numbers of the feature points of the previous frame and the current frame is zero (Step 55).

If the difference is zero ("Yes"), the CPU 11 determines that a frame-repeat error has occurred (Step 59). The frame-repeat error includes a repetition of the same frame.

If the difference is not zero ("No"), the CPU 11 determines whether or not the difference between the numbers of the feature points of the previous frame and the current frame is an integer multiple of the prescribed difference of the number of feature points (Step 56).

If the difference is an integer multiple of the prescribed difference ("Yes"), the CPU 11 determines that a frame-skip error has occurred (Step 60). The frame-skip error is an error in which a frame is skipped.

If the difference is not an integer multiple of the prescribed difference ("No"), the CPU 11 determines that a noise error has occurred (Step 61). The noise error includes a contamination of noise in the frame.

Then, the CPU 11 determines whether there is a frame that is not analyzed yet (Step 62). If there is any frame that is not analyzed yet, the CPU 11 repeats the above-described processing of Step 51 and the subsequent steps. If there is no such frame left, the CPU 11 outputs the result of the analysis to the display unit 16 (Step 63). Alternatively, the output of the result of the analysis may be made every time an error is detected in each step described above.

FIGS. 6A and 6B show an overview of processing of detection of the noise error, among the above-mentioned various types of errors.

In the normal video content, as shown in FIG. 6A, the difference of the number of the feature points between adjacent frames is a predetermined value (e.g., 25), constantly. However, in the video content where a noise has occurred, as shown in FIG. 6B, the difference would be a value different from that predetermined value. It is possible to detect the noise error by recognizing such a state.

FIGS. 7A and 7B show an overview of skip error detection processing of this embodiment. In the normal video content, as shown in FIG. 7A, the difference of the number of the feature points between adjacent frames is a prescribed value (e.g., 25), constantly. However, in the video content where a repeat error of frame has occurred, as described by frames f1 and f2 shown in FIG. 7B, the number of the feature points would be the same between adjacent frames, and therefore, the difference of the number of the feature points would be zero. It is possible to detect the repeat error of frame by recognizing such a state.

Besides, in cases where a skip error of frame has occurred, as described by frames f2 and f3 shown in FIG. 7B, the difference of the number of the feature points between adjacent frames would be an integer multiple of the prescribed value (e.g., 50, which is twice as large as the prescribed value 25). It is possible to detect the skip error of frame by recognizing such a state.

Figures 8A, 8B:
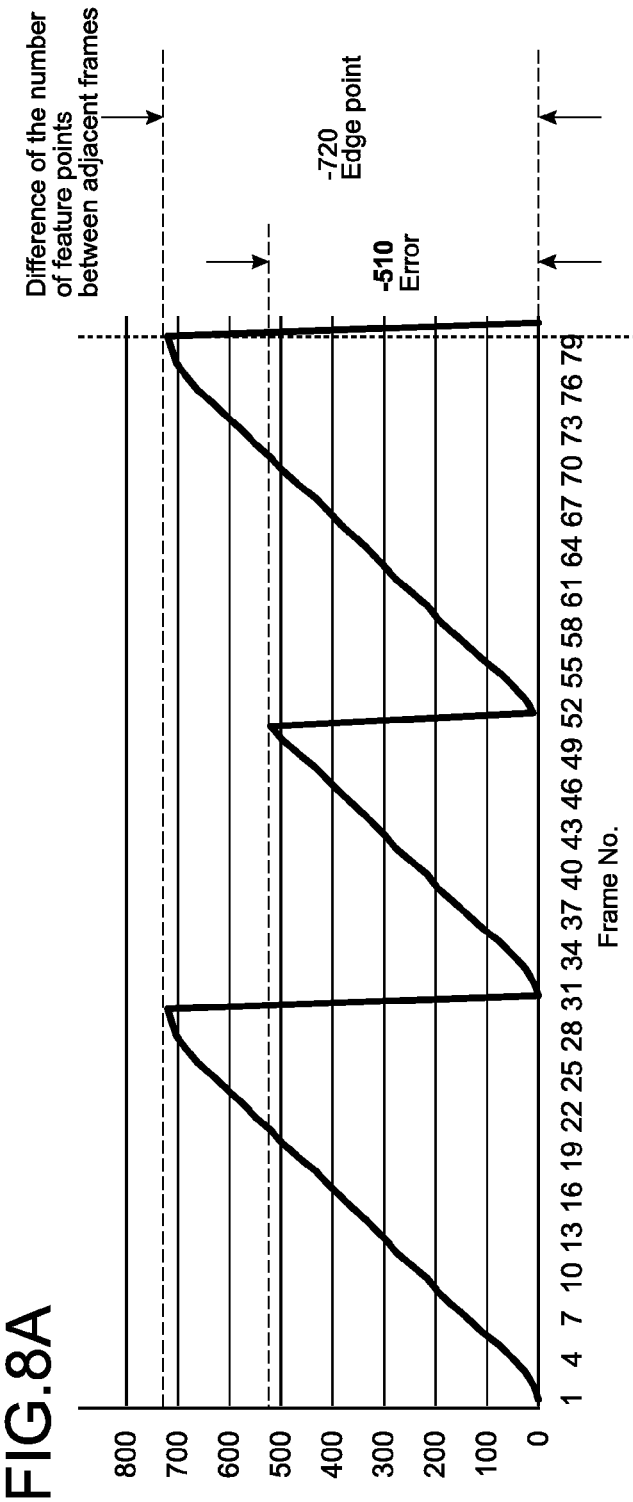
FIGS. 8A and 8B show an overview of error detection processing using edge points in the first embodiment.

FIGS. 8A and 8B show an overview of error detection processing using edge points in this embodiment. As shown in FIG. 8A, if the difference of the number of the feature points between adjacent frames is equal to the difference between the maximum and minimum values of the number of the feature points among all the numbers of the feature points (e.g., 720), and the number of the feature points of the later frame in these adjacent frames is zero, this frame would be defined as the above-mentioned "edge point".

However, as shown in FIG. 8A, if the difference of the number of the feature points between adjacent frames is not equal to the difference between the maximum and minimum values of the number of the feature points among all the numbers of the feature points (e.g., 510), and the number of the feature points of the later frame in these adjacent frames is zero, it can be considered that an error has occurred.

As shown in FIG. 8B, in cases where the difference of the number of the feature points between the adjacent frames is other than the prescribed value (e.g., 25), the PC 100 outputs the number of the feature value of this frame. Thus, regarding the normal video content, only the numbers of the feature points for the edge points, each of which numbers falls within the above-described numerical range, would be output. In cases where the number of the feature points which is not the above-described one is output (underlined part in FIG. 8B), it can be determined that some kind of error has occurred at this point.

Summary of First Embodiment

As described above, according to this embodiment, by using, as the test-content, a video content having the number of feature points monotonically increasing, and by calculating the difference of the number of the feature points between the frames, it is possible to promptly detect an error in a video which has occurred in the processing performed by the device to be evaluated.

Second Embodiment

Second embodiment of the present disclosure will be described. In this embodiment, a case of detecting an error in a content, which content is an audio content, will be described. Regarding this embodiment, the same configurations and operations as those of the above-described first embodiment will not be described again.

System Overview

Figure 9:
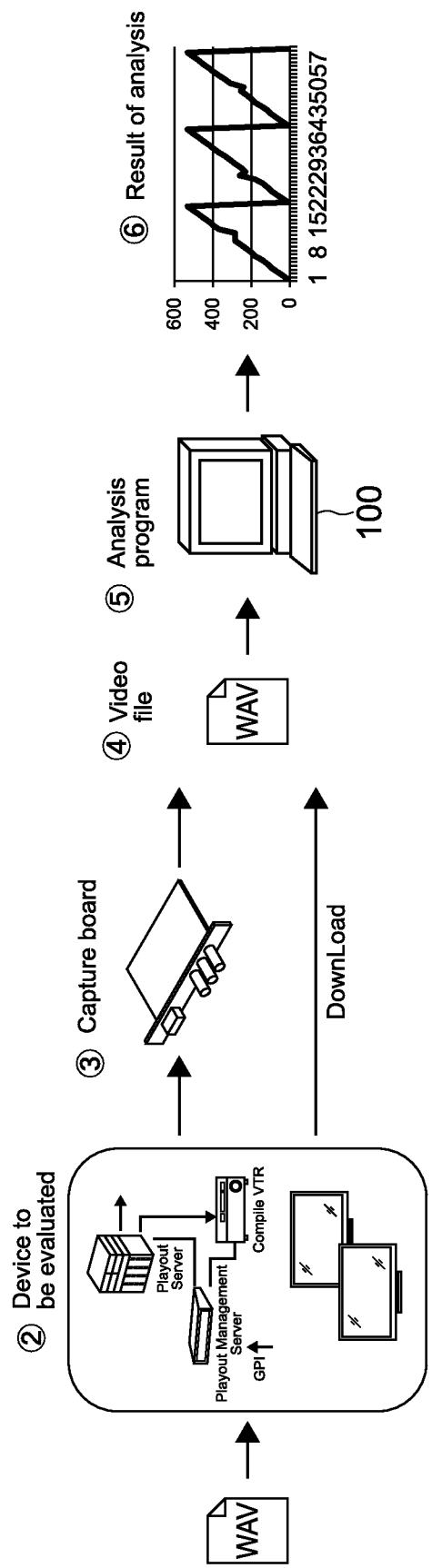
FIG. 9 shows a configuration of a system according to second embodiment of the present disclosure.

FIG. 9 shows a configuration of an error detection system according to this embodiment. In this embodiment, first, as shown in the figure, an audio content for testing (hereinafter referred to as a "test-content") is prepared, and then, the test-content is read by a device to be evaluated. Examples of the audio content include, but are not limited to, a WAV (RIFF waveform Audio Format) file.

Examples of the device to be evaluated may include the devices as described above regarding the first embodiment, and also dedicated devices for reproducing or recording sounds.

After some kind of processing such as recording and reproducing, which processing is executed by the above-mentioned device to be evaluated, the test-content would be output as audio signals.

In the same manner as in the first embodiment described above, in cases where the test-content is not able to be taken out as an audio file in a prescribed format (e.g., WAV file) from the device to be evaluated, the output test-content may be converted, by a capture board, to an audio file in the prescribed format. In cases where the test-content is able to be taken out as an audio file in the prescribed format, the output test-content may be used as it is.

Then, the output audio file is input to the PC 100 via the input unit 20 or the like, and analyzed by the analysis program in the PC 100. Thus, a result of analysis is output, and a sound error which has occurred in the device to be evaluated is detected.

Test-Content

Figure 10A:
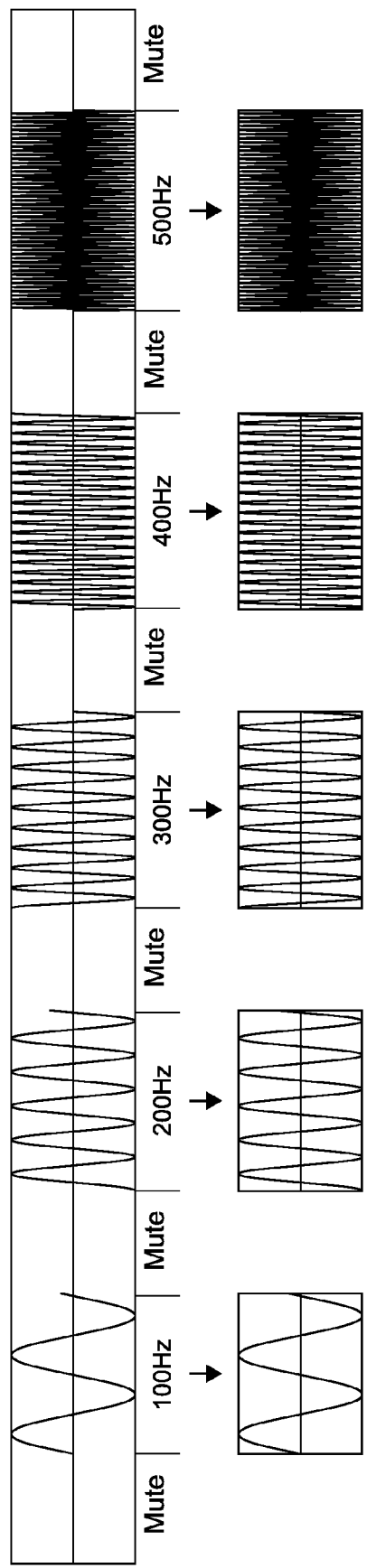
FIGS. 10A and 10B show a test-content which is used in the second embodiment.
Figure 10B:
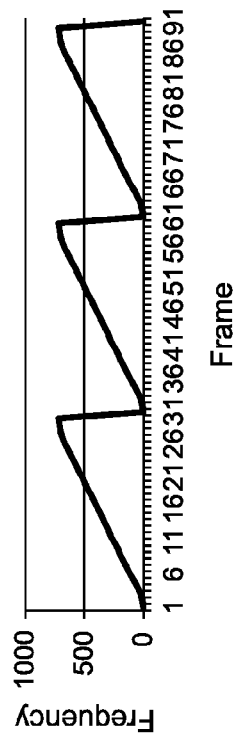

Next, the above-mentioned test-content, which is used in error detection processing, will be described. FIGS. 10A and 10B are figures for describing the test-content.

Unlike the video content of the above-described first embodiment, the audio content does not have a plurality of units for reproduction like the frames being ordered along a time axis. The audio content would be a continuous waveform data. Accordingly, in order to detect an error from the audio content in the same technique as that of the first embodiment in which the difference of the number of the feature points between the frames has been calculated, the audio content is needs to be divided in predetermined reproduction sections.

In view of this, as shown in FIG. 10A, an audio content which has periodically repeated mutes (mute intervals), with each mute for a certain time, is used. This audio content contains stationary waves between each mute and the next mute, the stationary waves having a frequency as the number of the feature points, the frequency monotonically increasing or decreasing across each mute. The sections having the stationary waves serve as the frames in the video content.

In the analysis, by processing of the PC 100, the mutes are removed, and the audio content is divided into audio files each of which has the section having the stationary waves only. In this embodiment, the divided audio files will be referred to as the "frames".

In addition, in this test-content, as shown in

FIG. 10B, the monotonic increase of the number of the feature points is periodically repeated every edge point after a predetermined fixed number of frames.

The difference of the frequency between the frames, which frequency monotonically increases may be, for example, 100 Hz. However, the difference is not limited to this value.

Operation of PC

Next, a description will be given on the operation of the PC 100 configured as described above. In this embodiment, in the same manner as in the first embodiment, the operation of the PC 100 is performed by the CPU 11 and the software (analysis program) executed under control thereof in cooperation with each other.

Overview of Error Detection Processing

Figure 11:
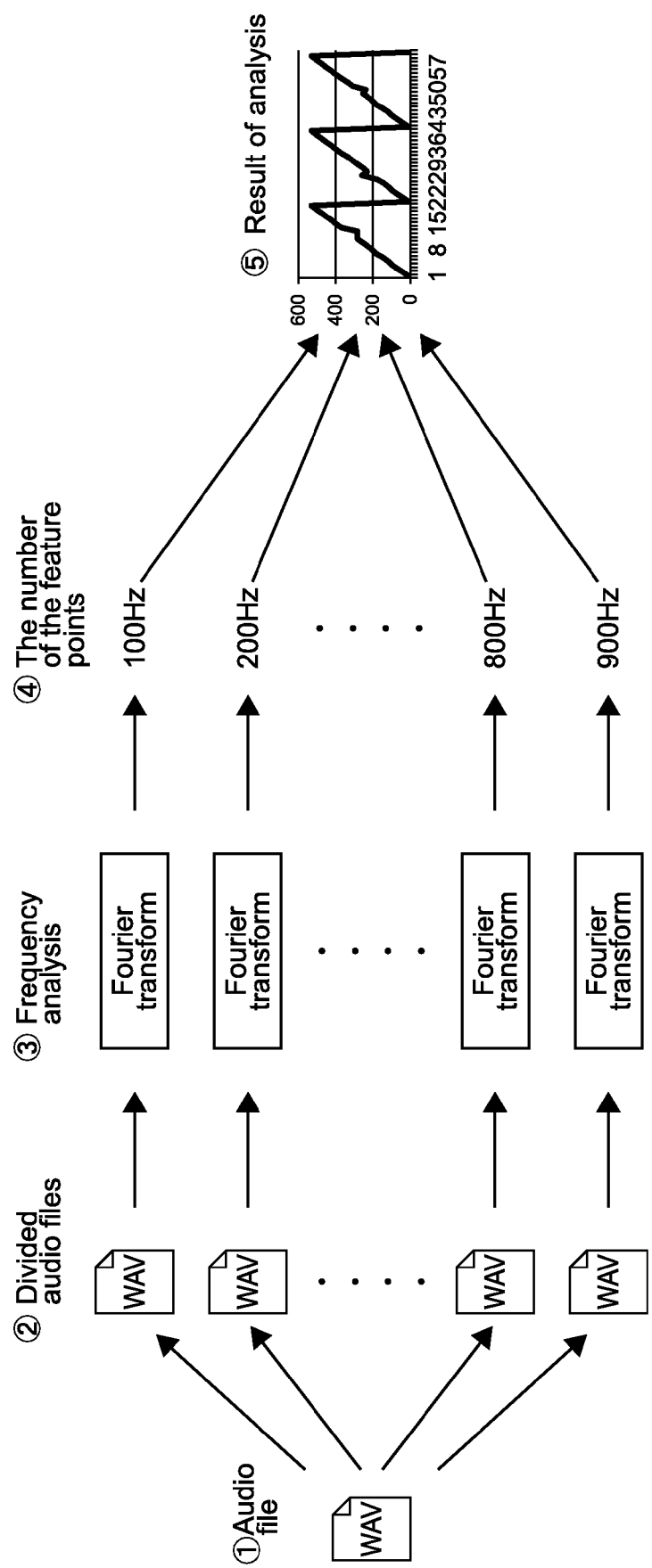
FIG. 11 shows an overview of error detection processing of the second embodiment.

FIG. 11 shows an overview of error detection processing of this embodiment. As shown in the figure, the PC 100 first extracts every frame, one by one, from the processed data which is an audio file (e.g., WAV file) taken out of a device to be evaluated, the video file being input to (read into) the PC 100. The PC 100 converts each frame into a corresponding separate audio file.

Subsequently, the PC 100 executes frequency analysis processing by Fourier transform on each audio file.

Then, the PC 100 collects the number of the feature points which is the calculated frequency for each frame, and outputs the numbers of the feature points as a result of analysis to the display unit 16.

Details of Error Detection Processing

Figure 12:
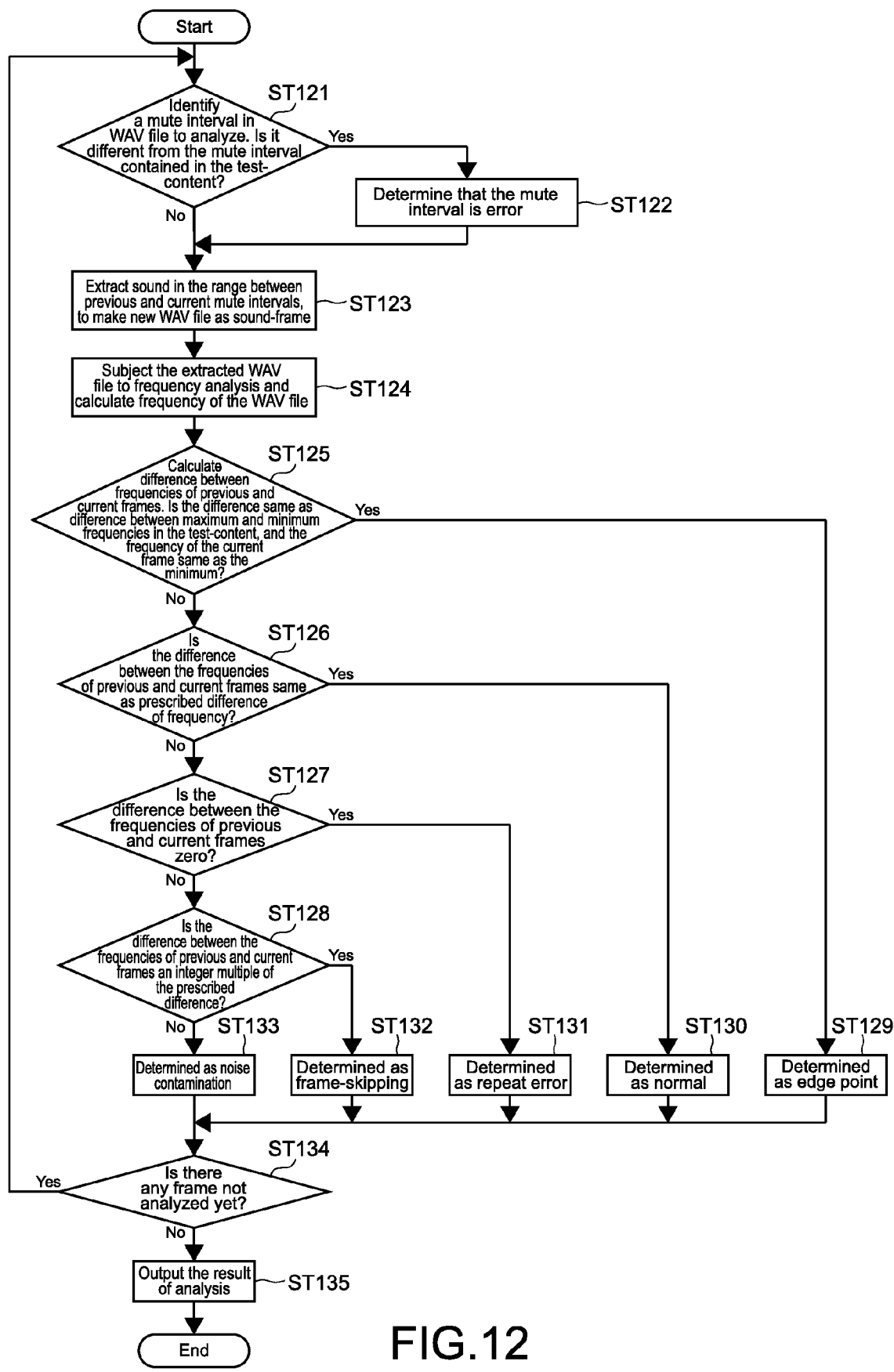
FIG. 12 is a flowchart showing the flow of error detection processing of the second embodiment.

FIG. 12 is a flowchart showing the flow of error detection processing of this embodiment. As shown in the figure, first, the CPU 11 of the PC 100 identifies a mute interval in the audio file (WAV file) to analyze, which audio file is taken out of the device to be evaluated. The CPU 11 determines whether or not the identified mute interval is different from the mute interval which is inserted in the test-content (Step 121).

If the mute interval of the above-mentioned audio file is different from the mute interval in the test-content (Yes), the CPU 11 determines that an error has occurred in the mute interval (Step 122).

If the mute interval of the above-mentioned audio file is identical with the mute interval in the test-content (No), the CPU 11 extracts audio data in the range between two adjacent mute intervals, to make new WAV file as a sound-frame (Step 123).

Then, the CPU 11 executes frequency analysis processing on the extracted new WAV file, and measures the frequency of the WAV file (Step 124).

Subsequently, the CPU 11 takes two frames to be processed, and calculates a difference between the frequency of the current frame and the frequency of one frame before the current one. The CPU 11 then determines whether or not the calculated difference between the frequencies is the same value as a difference between predetermined maximum and minimum values of frequency (or in a predetermined range therefrom), and, whether or not the frequency of the current frame is the same value as the minimum value (Step 125).

If the calculated difference is the same value as the difference between the maximum and minimum values, and the frequency of the current frame is the same value as the minimum value ("Yes"), the CPU 11 determines that the current frame is an "edge point" (no error has occurred) (Step 129).

If the calculated difference is not the same value as the difference between the maximum and minimum values, or the frequency of the current frame is not the same value as the minimum value ("No"), the CPU 11 determines whether or not the difference between the frequencies of the previous frame and the current frame is the same value as a prescribed difference of the frequency (e.g., 100 Hz) (Step 126).

If the difference between the frequencies of the previous frame and the current frame is the same value as the prescribed difference of the frequency ("Yes"), the CPU 11 determines that these two frames are normal (no error has occurred) (Step 130).

If the difference between the frequencies of the previous frame and the current frame is not the same value as the prescribed difference of the frequency ("No"), the CPU 11 determines whether or not the difference between the frequencies of the previous frame and the current frame is zero (Step 127).

If the difference is zero ("Yes"), the CPU 11 determines that a frame-repeat error has occurred (Step 131). The frame-repeat error includes a repetition of the same frame (audio data in a certain section).

If the difference is not zero ("No"), the CPU 11 determines whether or not the difference between the frequencies of the previous frame and the current frame is an integer multiple of the prescribed difference of the frequency (Step 128).

If the difference is an integer multiple of the prescribed difference ("Yes"), the CPU 11 determines that a frame-skip error has occurred (Step 132). The frame-skip error is an error in which a frame (audio data in a certain section) is skipped.

If the difference is not an integer multiple of the prescribed difference ("No"), the CPU 11 determines that a noise error has occurred (Step 133). The noise error includes a contamination of noise in the frame (sound).

Then, the CPU 11 determines whether there is a frame that is not analyzed yet (Step 134). If there is any frame that is not analyzed yet, the CPU 11 repeats the above-described processing of Step 121 and the subsequent steps. If there is no such frame left, the CPU 11 outputs the result of the analysis to the display unit 16 (Step 135). Alternatively, the output of the result of the analysis may be made every time an error is detected in each step described above.

FIGS. 13A and 13B show an overview of processing of detection of the noise error, among the above-mentioned various types of errors. In the normal audio content, as shown in FIG. 13A, the difference of the frequency between adjacent frames is a predetermined value (e.g., 25 Hz), constantly. However, in the audio content where a noise has occurred, as shown in FIG. 13B, the difference would be a value different from that predetermined value. It is possible to detect the noise error by recognizing such a state.

FIGS. 14A and 14B show an overview of skip error detection processing of this embodiment. In the normal audio content, as shown in FIG. 14A, the difference of the frequency between adjacent frames is a prescribed value (e.g., 100 Hz), constantly. However, in the audio content where a repeat error of frame has occurred, as described by frames f1 and f2 shown in FIG. 14B, the frequency would be the same between adjacent frames, and therefore, the difference of the frequency would be zero. It is possible to detect the repeat error of frame by recognizing such a state.

Besides, in cases where a skip error of frame has occurred, as described by frames f2 and f3 shown in FIG. 14B, the difference of the frequency between adjacent frames would be an integer multiple of the prescribed value (e.g., 200 Hz, which is twice as large as the prescribed value 100 Hz). It is possible to detect the skip error of frame by recognizing such a state.

Summary of Second Embodiment

As described above, according to this embodiment, by using, as the test-content, an audio content having the frequency as the number of feature points monotonically increasing from one predetermined section to another, and by calculating the difference of the frequency between the predetermined sections, it is possible to promptly detect a sound error which has occurred in the processing performed by the device to be evaluated.

Modified Examples

The present disclosure is not limited to the embodiment described above and can be variously modified without departing from the gist of the present disclosure. In the first and second embodiments described above, the content, in which the number of the feature points for each unit for reproduction (the number of feature points in image, or frequency) monotonically increases by a predetermined difference along passage of reproduction time, has been used as the test-content. However, it is also possible to use, as the test-content, a content in which the number of the feature points for each unit for reproduction monotonically decreases by a predetermined difference along passage of reproduction time.

In the first embodiment described above, the content in which the number of grid-points as the feature points monotonically increases has been used as the test-content. However, the test-content of a video content is not limited thereto. For example, it is also possible to use a content having a plurality of dots as the feature points, in which the number of the dots monotonically increases or decreases as the frame goes on from one frame to another.

In the second embodiment described above, the content in which the frequency as the number of feature points monotonically increases, or more specifically, the content having a fixed amplitude and wavelengths getting gradually smaller, has been used as the test-content. However, the test-content of an audio content is not limited thereto. For example, it is also possible to use a content having a fixed wavelength and amplitudes getting gradually larger or smaller. Further, for example, a content in which the volume of sound instead of the frequency monotonically increases or decreases may be used as well.

In the first and second embodiments described above, the PC 100 which is a general-purpose PC has been described as an example of the information processing apparatus for executing the analysis program. However, it is also possible that the processing of analysis is executed by a dedicated computer for the processing of analysis.

The processes shown in the first and second embodiments described above may also be executed in combination or in parallel, so far as they do not conflict with each other. For example, in cases where the video content in the first embodiment is a movie content, or the like, which also contains sound, the content may be separated into a video content and an audio content. In such cases, the above-described processing of the first embodiment and that of the second embodiment may be executed concurrently.

Others

The present disclosure can have the following configurations:

(1) An information processing apparatus, including:
   an input unit configured to receive processed data having resulted from a process in which a test-content is read and processed by a device to be evaluated, the test-content being composed of a plurality of units for reproduction ordered along a time axis, each unit for reproduction having feature points, the number of the feature points monotonically increasing or decreasing by a predetermined difference along passage of reproduction time;
   a storage unit configured to store the predetermined difference; and
   a control unit configured to
      calculate the numbers of the feature points with respect to each of two adjacent units among the units for reproduction in the processed data, and
      detect an error in the processed data by determining whether or not a difference between the calculated numbers of the feature points is equal to the stored difference.

(2) The information processing apparatus according to (1), in which
   the control unit is configured to determine that the error is a noise error including a contamination of noise in the processed data in cases where
      the calculated difference is not equal to the stored difference, not zero, and not an integer multiple of the stored difference.

(3) The information processing apparatus according to (1) or (2), in which
   the control unit is configured to determine that the error is a repeat error including a repetition of a certain part of the units for reproduction in the processed data in cases where the calculated difference is not equal to the stored difference and
      the calculated difference is zero.

(4) The information processing apparatus according to any one of (1) to (3), in which
the control unit is configured to determine that the error is a skip error in which a certain part of the units for reproduction in the processed data is skipped, in cases where
the calculated difference is not equal to the stored difference and
the calculated difference is an integer multiple of the stored difference.

(5) The information processing apparatus according to any one of (1) to (4), in which
the monotonic increase or decrease of the feature points is periodically repeated every predetermined edge point in the test-content, and
the control unit is configured to determine that the error has occurred, in cases where
at least one of the numbers of the feature points with respect to each of two units across the edge point among the units for reproduction is zero, and
the calculated difference between the numbers of the feature points with respect to each of the two units is different from a difference between predetermined maximum and minimum values of the number of the feature points.

(6) The information processing apparatus according to any one of (1) to (5), in which
the test-content is a video content having a plurality of frames as the units for reproduction, and
the control unit is configured to
extract two pieces of still image data which are two frames from the processed data and
extract feature points and calculate the number of the feature points from each of the two pieces of still image data.

(7) The information processing apparatus according to any one of (1) to (5), in which
the test-content includes audio data having pieces of waveform data as the units for reproduction, each piece of waveform data being data between a plurality of periodically repeated mute intervals, the piece of waveform data having a frequency as the number of the feature points, the frequency monotonically increasing or decreasing across each mute interval in the mute intervals, and
the control unit is configured to
extract two pieces of waveform data across each mute interval from the processed data and
calculate the frequencies of each of the two pieces of waveform data.

(8) The information processing apparatus according to any one of (1) to (7), further including
an output unit configured to output information of a result of detection indicating the detected error.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus, comprising:
an input unit configured to receive processed data having resulted from a process in which a test-content is read and processed by a device to be evaluated, the test-content being composed of a plurality of units for reproduction ordered along a time axis, each unit for reproduction having feature points, the number of the feature points monotonically increasing or decreasing by a predetermined difference along passage of reproduction time;
a storage unit configured to store the predetermined difference; and
a control unit configured to
calculate the numbers of the feature points with respect to each of two adjacent units among the units for reproduction in the processed data, and
detect an error in the processed data by determining whether or not a difference between the calculated numbers of the feature points is equal to the stored difference.

2. The information processing apparatus according to claim 1, wherein
the control unit is configured to determine that the error is a noise error including a contamination of noise in the processed data in cases where
the calculated difference is not equal to the stored difference, not zero, and not an integer multiple of the stored difference.

3. The information processing apparatus according to claim 1, wherein
the control unit is configured to determine that the error is a repeat error including a repetition of a certain part of the units for reproduction in the processed data in cases where
the calculated difference is not equal to the stored difference and
the calculated difference is zero.

4. The information processing apparatus according to claim 1, wherein
the control unit is configured to determine that the error is a skip error in which a certain part of the units for reproduction in the processed data is skipped, in cases where
the calculated difference is not equal to the stored difference and
the calculated difference is an integer multiple of the stored difference.

5. The information processing apparatus according to claim 1, wherein
the monotonic increase or decrease of the feature points is periodically repeated every predetermined edge point in the test-content, and
the control unit is configured to determine that the error has occurred, in cases where
at least one of the numbers of the feature points with respect to each of two units across the edge point among the units for reproduction is zero, and
the calculated difference between the numbers of the feature points with respect to each of the two units is different from a difference between predetermined maximum and minimum values of the number of the feature points.

6. The information processing apparatus according to claim 1, wherein
the test-content is a video content having a plurality of frames as the units for reproduction, and
the control unit is configured to
extract two pieces of still image data which are two frames from the processed data and
extract feature points and calculate the number of the feature points from each of the two pieces of still image data.

7. The information processing apparatus according to claim 1, wherein the test-content includes audio data having pieces of waveform data as the units for reproduction, each piece of waveform data being data between a plurality of periodically repeated mute intervals, the piece of waveform data having a frequency as the number of the feature points, the frequency monotonically increasing or decreasing across each mute interval in the mute intervals, and the control unit is configured to extract two pieces of waveform data across each mute interval from the processed data and calculate the frequencies of each of the two pieces of waveform data.

8. The information processing apparatus according to claim 1, further comprising an output unit configured to output information of a result of detection indicating the detected error.

9. An information processing method, comprising:

reading processed data having resulted from a process in which a test-content is read and processed by a device to be evaluated, the test-content being composed of a plurality of units for reproduction ordered along a time axis, each unit for reproduction having feature points, the number of the feature points monotonically increasing or decreasing by a predetermined difference along passage of reproduction time;

calculating the numbers of the feature points with respect to each of two adjacent units among the units for reproduction in the processed data; and detecting an error in the processed data by determining whether or not a difference between the calculated numbers of the feature points is equal to the stored difference.

* * * * *